United States Patent
Averbouch et al.

(10) Patent No.: US 8,954,678 B2
(45) Date of Patent: Feb. 10, 2015

(54) AUTOMATIC PATTERN-BASED OPERAND PREFETCHING

(75) Inventors: Ilia Averbouch, Haifa (IL); Ariel J. Birnbaum, Kiryat Motzkin (IL); Jonathan T. Hsieh, Poughkeepsie, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 13/523,922

(22) Filed: Jun. 15, 2012

(65) Prior Publication Data

US 2013/0339617 A1 Dec. 19, 2013

(51) Int. Cl.
*G06F 12/12* (2006.01)

(52) U.S. Cl.
USPC .......................................... 711/133

(58) Field of Classification Search
None
See application file for complete search history.

(56) References Cited

U.S. PATENT DOCUMENTS

| | | | |
|---|---|---|---|
| 5,093,777 A * | 3/1992 | Ryan | 711/3 |
| 5,790,823 A | 8/1998 | Puzak et al. | |
| 2007/0150660 A1 | 6/2007 | Marathe et al. | |
| 2009/0198964 A1 * | 8/2009 | Xiao et al. | 712/207 |

OTHER PUBLICATIONS

Porterfield, A.K., Software Methods for Improvement of Cache Performance on Supercomputer Applications. PhD thesis, pp. 1-163. Rice University, May 1989.

* cited by examiner

*Primary Examiner* — Duc Doan
(74) *Attorney, Agent, or Firm* — Cantor Colburn LLP; Margaret McNamara

(57) ABSTRACT

Embodiments relate to automatic pattern-based operand prefetching. An aspect includes receiving, by prefetch logic in a processor, an operand cache miss from a pipeline of the processor. Another aspect includes determining that an entry in a history table corresponding to the operand cache miss exists based on an instruction address of the operand cache miss. Yet another aspect includes, based on determining that the entry corresponding to the operand cache miss exists in the history table, issuing a prefetch instruction for a second operand based on the determined entry in the history table, and writing the determined entry into a miss buffer.

20 Claims, 9 Drawing Sheets

MISS BUFFER 301

| INSTRUCTION ADDRESS 302A | OPERAND ADDRESS 303A | STRIDE 304A | CONFIDENCE COUNTER 305A |
|---|---|---|---|
| INSTRUCTION ADDRESS 302B | OPERAND ADDRESS 303B | STRIDE 304B | CONFIDENCE COUNTER 305B |

HISTORY TABLE 311

| STRIDE 314A | CONFIDENCE COUNTER 315A |
|---|---|
| STRIDE 314B | CONFIDENCE COUNTER 315B |
| STRIDE 314C | CONFIDENCE COUNTER 305C |
| STRIDE 314N | CONFIDENCE COUNTER 315N |

FIG. 3

MISS BUFFER 601

| INSTRUCTION ADDRESS 602A | OPERAND ADDRESS 603A | STRIDE 604A | CONFIDENCE COUNTER 605A | TAG 606A | LIVENESS COUNTER 607A | FLAG 608A |
|---|---|---|---|---|---|---|
| INSTRUCTION ADDRESS 602B | OPERAND ADDRESS 603B | STRIDE 604B | CONFIDENCE COUNTER 605B | TAG 606B | LIVENESS COUNTER 607B | FLAG 608B |

HISTORY TABLE 611

| STRIDE 614A | CONFIDENCE COUNTER 615A | TAG 616A | LIVENESS COUNTER 617A |
|---|---|---|---|
| STRIDE 614B | CONFIDENCE COUNTER 615B | TAG 616B | LIVENESS COUNTER 617B |
| STRIDE 614C | CONFIDENCE COUNTER 615C | TAG 606C | LIVENESS COUNTER 617C |
| STRIDE 614N | CONFIDENCE COUNTER 615N | TAG 616N | LIVENESS COUNTER 617N |

FIG. 6

AUTOMATIC PATTERN-BASED OPERAND PREFETCHING

BACKGROUND

The present invention relates generally to computer processors, and more specifically, to automatic pattern-based operand prefetching in a processor.

In a computing system, the main computer memory may be relatively slow compared to the computer processor; therefore, one or more caches may be provided in the processor to reduce or avoid accesses to the main memory. A cache is a relatively small, high-speed buffer of memory placed between the processor and the main memory that holds most recently used sections of the main memory for use by the processor. The sections of memory that are stored in the cache are referred to as a cache lines. Any request made by the processor that is satisfied by the cache may be completed relatively quickly. However, when a request by the processor is not satisfied by the cache, a cache miss occurs, which may cause delays in the processor while the request is satisfied from the main memory.

Prefetching is a technique that is used to reduce delays to the processor caused by cache misses. Prefetching attempts to predict requests (for example, requests for instructions or operands) that will be made by the processor and stage lines of memory into the cache before the processor requests them. If prefetching is successful, cache lines are transferred from the main memory into the cache before the processor requests them, avoiding cache misses and reducing overall latency in the processor.

SUMMARY

Embodiments include a method, system, and computer program product for automatic pattern-based operand prefetching. An aspect includes receiving, by prefetch logic in a processor, an operand cache miss from a pipeline of the processor. Another aspect includes determining that an entry in a history table corresponding to the operand cache miss exists based on an instruction address of the operand cache miss. Yet another aspect includes, based on determining that the entry corresponding to the operand cache miss exists in the history table, issuing a prefetch instruction for a second operand based on the determined entry in the history table, and writing the determined entry into a miss buffer.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 3 depicts a miss buffer and a history table for automatic pattern-based operand prefetching in accordance with an embodiment;

FIG. 6 depicts a miss buffer and a history table for automatic pattern-based operand prefetching in accordance with another embodiment;

DETAILED DESCRIPTION

Figure 1:
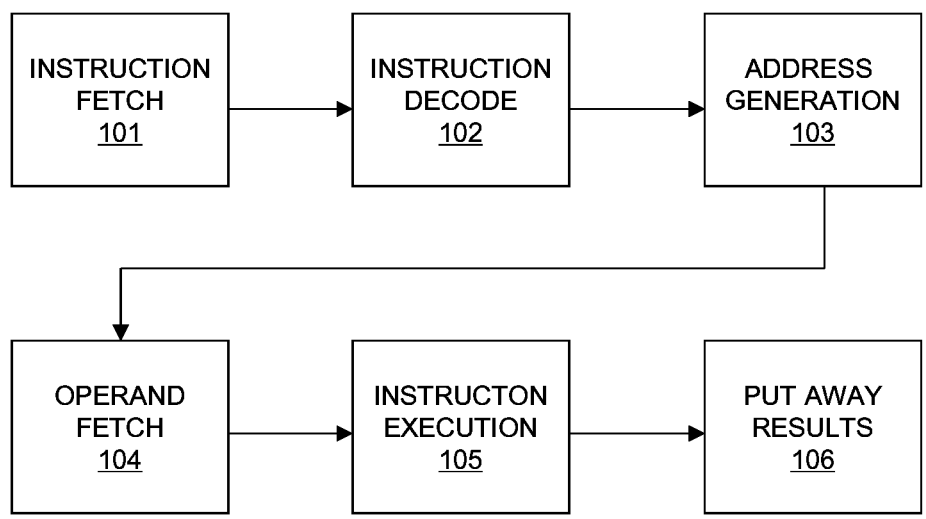
FIG. 1 depicts a pipeline in accordance with an embodiment.

Systems and methods for automatic pattern-based operand prefetching are provided, with exemplary embodiments being discussed below in detail. During execution of software by a processor in a computing system, repeating patterns of instruction and operand fetches may be performed by the processor pipeline. In particular, a first operand fetch may be repeatedly followed by a second operand fetch that has a particular stride, or distance between addresses in the memory, from the first operand fetch. Detection of the pattern allows automatic prefetching of the second operand to be performed when an operand cache miss for the first operand fetch is detected. Pattern detection may be performed based on a predicted stride and a confidence counter. An current operand cache miss associated with a first operand may be compared to a history table entry for a previous operand cache miss having the same instruction address as the current cache miss, and, if the confidence counter for the history table entry is above a confidence threshold (i.e., a pattern is detected), a prefetch of a second operand based on the detected pattern may be automatically triggered. The prefetch request for the second operand may have an operand address equal to the operand address of the current cache miss plus the predicted stride of the history table entry.

Entries comprising data regarding previous operand cache misses may be stored in a miss buffer and a history table in the processor. The miss buffer stores information about the most recent cache misses. The miss buffer may comprise a relative small and fast buffer, having, for example, two entries in some embodiments. The miss buffer entries may be modified and evicted based on current operand cache misses. Entries that are evicted from the miss buffer are written into the history table. A history table entry may be loaded back into the miss buffer when a cache miss is detected having the same instruction address as the history table entry. The entries in the miss buffer and the history table each include a plurality of fields, including an instruction address (or a hash function of the instruction address) of a cache miss, the predicted stride, and the confidence counter. The miss buffer additionally includes a field for an operand address of the cache miss. The predicted stride is initially blank at the time of entry creation, and is filled in based on a difference between the entry's operand address and an operand address of a subsequent current operand cache miss. The confidence counter indicates the number of times the predicted stride is confirmed for the instruction address. The confidence counter may be incremented each time the same predicted stride is observed for a particular instruction address until a maximum confidence counter value is reached in some embodiments.

In further embodiments, the history table and miss buffer entries may also include an address tag that includes additional bits of the instruction address and a liveness counter. The miss buffer entries may also include a mismatch flag, which comprises a single bit that indicates the occurrence of an address mismatch. The address tag, mismatch flag, and liveness counter may be used for collision detection. A history table entry corresponding to a current operand cache miss may be retrieved from the history table based on the instruction address, and the liveness counter and address tag may be checked. If the liveness counter of the history table entry is zero, the history table entry is discarded and a new history table entry for the current operand cache miss is created. If the address tag for the existing history table entry does not match the instruction address of the current cache miss, a mismatch is indicated, and the liveness counter is decremented based on the mismatch.

FIG. 1 depicts a pipeline 100 for a processor in accordance with an embodiment. The pipeline 100 includes an instruction fetch stage 101, an instruction decode stage 102, an address generation stage 103, an operand fetch stage 104, an instruction execution stage 105, and a put away of results stage 106. Each instruction may enter the pipeline and spend one cycle at each pipeline stage. If the pipeline 100 is kept full of requests that are being processed, then each pipeline component 101-106 is kept active, and a request may be completed every pipeline cycle. The pipeline 100 may be used in conjunction with one or more caches, such as an instruction cache and an operand cache. Cache misses that occur in the instruction fetch stage 101 or operand fetch stage 104 may slow down operation of the pipeline 100.

Figure 2:
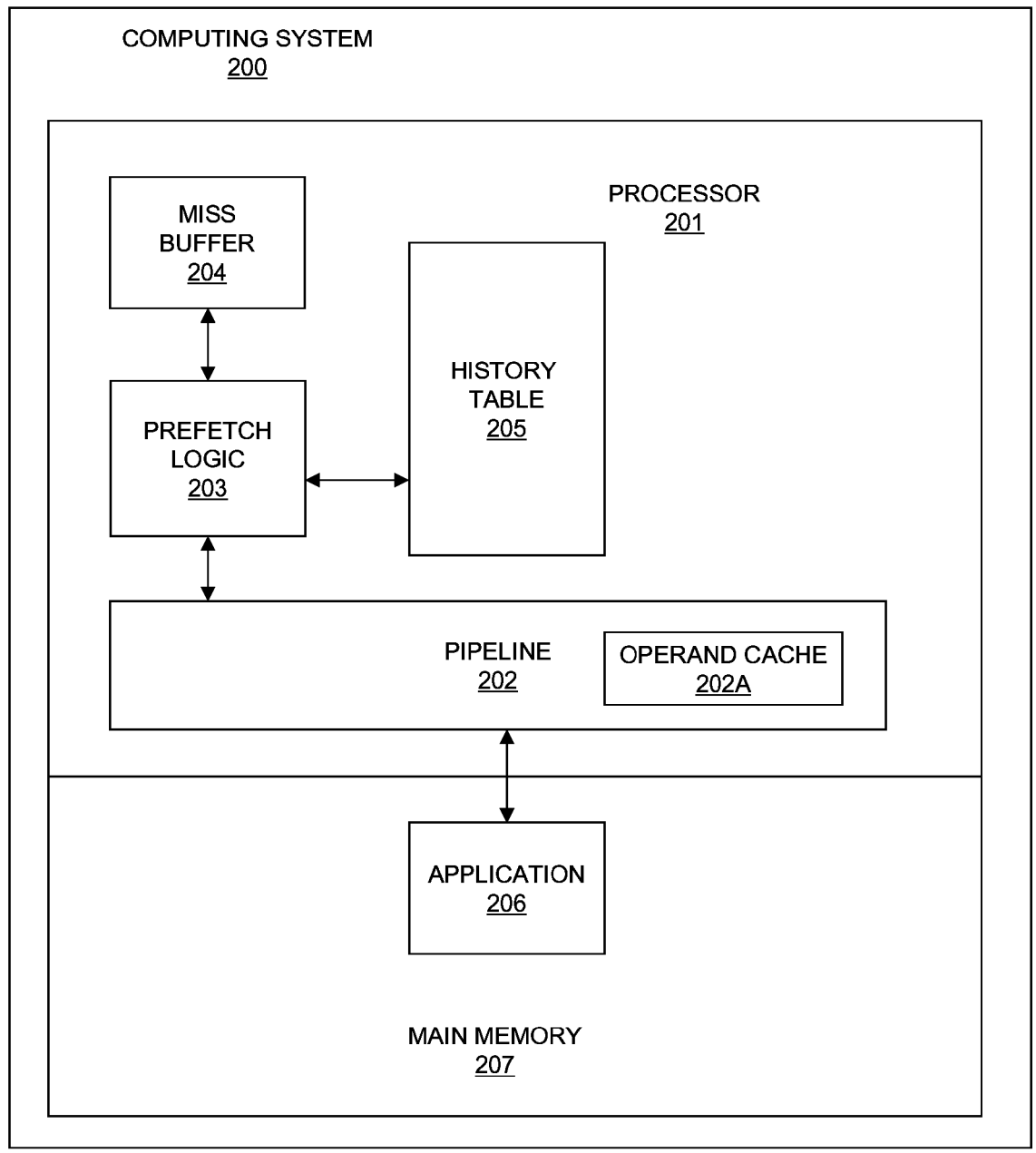
FIG. 2 depicts a computing system for automatic pattern-based operand prefetching in accordance with an embodiment.

FIG. 2 illustrates an embodiment of a computing system 200 for automatic pattern-based prefetching. Computing system 200 comprises a processor 201 and a main memory 207. During execution of an application 206 by the processor 201 instructions are issued to the pipeline 202. Pipeline 202 may comprise the pipeline stages that were illustrated with respect to pipeline 100 of FIG. 1. The pipeline 202 additionally includes operand cache 202A. The prefetch logic 203 issues prefetch requests into pipeline 202. These prefetch requests act to retrieve lines from the main memory 207 to the operand cache 202A before the lines are needed in the pipeline 202. Prefetch logic 203 additionally determines patterns in operand cache misses in pipeline 202 using miss buffer 204 and history table 205, and may automatically issue prefetch requests to pipeline 202 based on determined patterns. If an operand fetch, which may occur in operand fetch stage 104 of pipeline 100/202, misses the operand cache 202A, a prefetch of another operand based on a detected pattern associated with the operand cache miss may be issued. An entry for the operand cache miss is also written into miss buffer 204. This entry evicts an existing entry from the miss buffer 204, which is stored in history table 205.

FIG. 3 illustrates an embodiment of a miss buffer 301 and a history table 311. In some embodiments, miss buffer 301 may comprise miss buffer 204 of FIG. 2, and history table 311 may comprise history table 205 of FIG. 2. Each entry in the miss buffer 301 and history table 311 includes a respective predicted stride 304A-B/314A-N and confidence counter 305A-B/315A-N. The miss buffer entries in miss buffer 301 each additionally comprise an instruction address 302A-B and operand address 303A-B. The entries in history table 311 are indexed using a hash of the instruction address associated with the entry. Miss buffer 301 and history table 311 are shown for illustrative purposes only; a miss buffer and history table may each comprise any appropriate number of entries.

Figure 4:
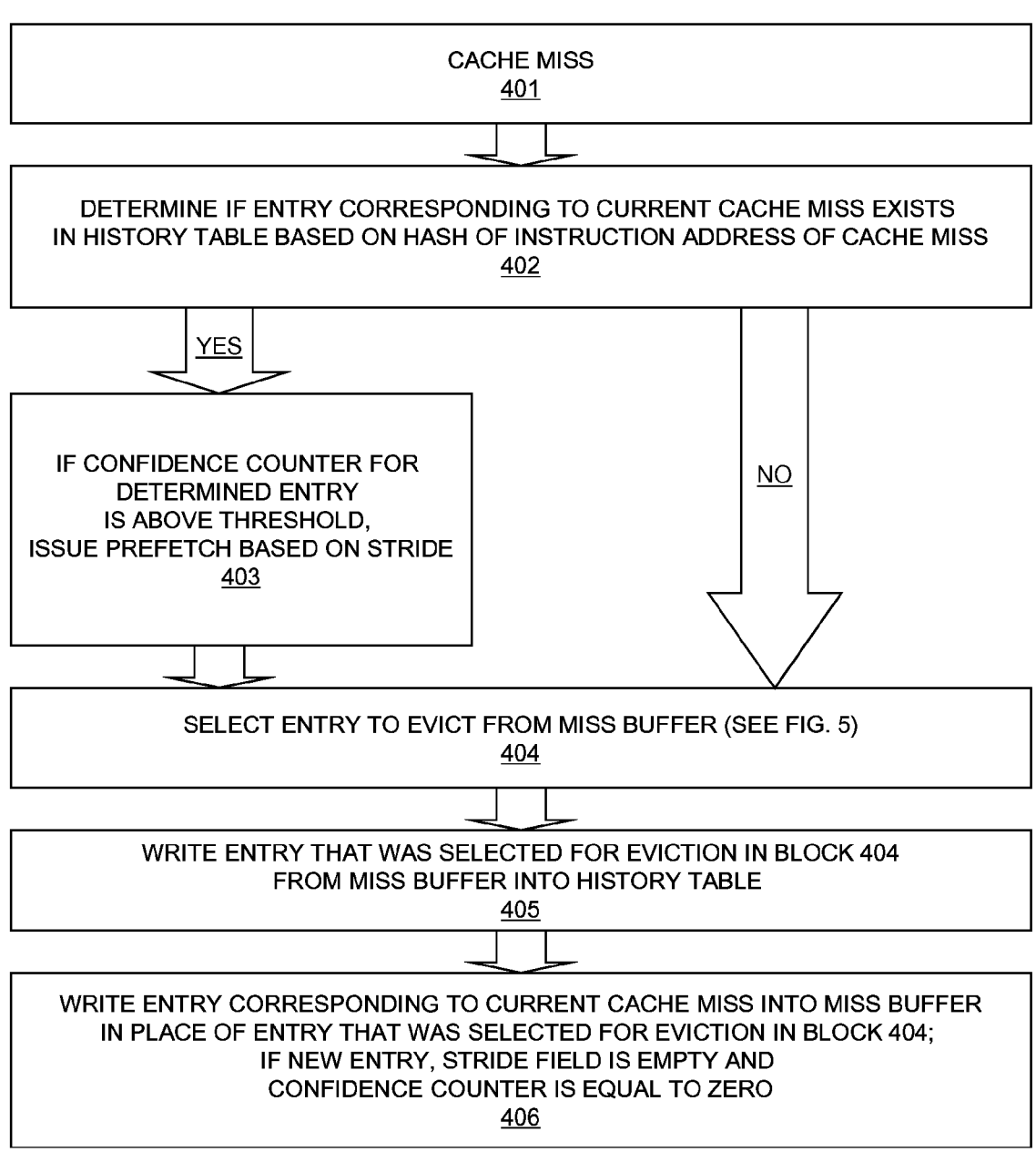
FIGS. 4-5 depict a process flow for automatic pattern-based operand prefetching in accordance with an embodiment.

FIG. 4 illustrates a flowchart of an embodiment of a method 400 for automatic pattern-based prefetching. FIG. 4 is discussed with respect to FIGS. 2 and 3. First, in block 401, an operand cache miss occurs in pipeline 202. Next, in block 402, the history table 205/311 is checked by prefetch logic 203 to determine the existence of an entry that is indexed by a hash of the instruction address of the current cache miss that occurred in block 401. If no entry that is indexed by a hash of the instruction address of the current cache miss exists in the history table 205/311, flow then proceeds to block 404 of FIG. 4. However, if an entry (for example, history table entry 314A-315A) that is indexed by a hash of the instruction address of the current cache miss exists in the history table 205/311, flow proceeds to block 403 of method 400, in which, if the confidence counter 315A for the determined history table entry is above a confidence threshold, a prefetch instruction for a next operand is issued based on the predicted stride 314A. The prefetch request for the next operand may have an operand address equal to the operand address of the current cache miss plus the predicted stride 314A.

Flow of method 400 then proceeds to block 404, in which an entry in miss buffer 204/301 is selected for eviction. The process flow of block 404 of FIG. 4 is shown in further detail with respect to FIG. 5. Then, flow of method 400 proceeds to block 405, in which the entry that was selected for eviction (for example, entry 302A-305A) from the miss buffer 204/301 in block 404 is written into the history table 205/311. In the event the history table 205/311 is full, an oldest entry in the history table 205/311 may be overwritten in block 405 in some embodiments. Lastly, in block 406, an entry corresponding to the current cache miss is inserted into the miss buffer 204/301 in place of the entry that was selected for eviction in block 404. The inserted entry may comprise the entry from the history table 205/311 that was identified in block 402 of method 400, or, if the entry comprises a new entry (i.e., no entry was determined in block 402 of method 400), a new entry comprising the instruction address 302A and operand address 303A of the current cache miss is created and inserted into the miss buffer 204/301. The predicted stride 304A for the new entry is initially empty (or zero), and the confidence counter 305A is initially set to zero.

Figure 5:
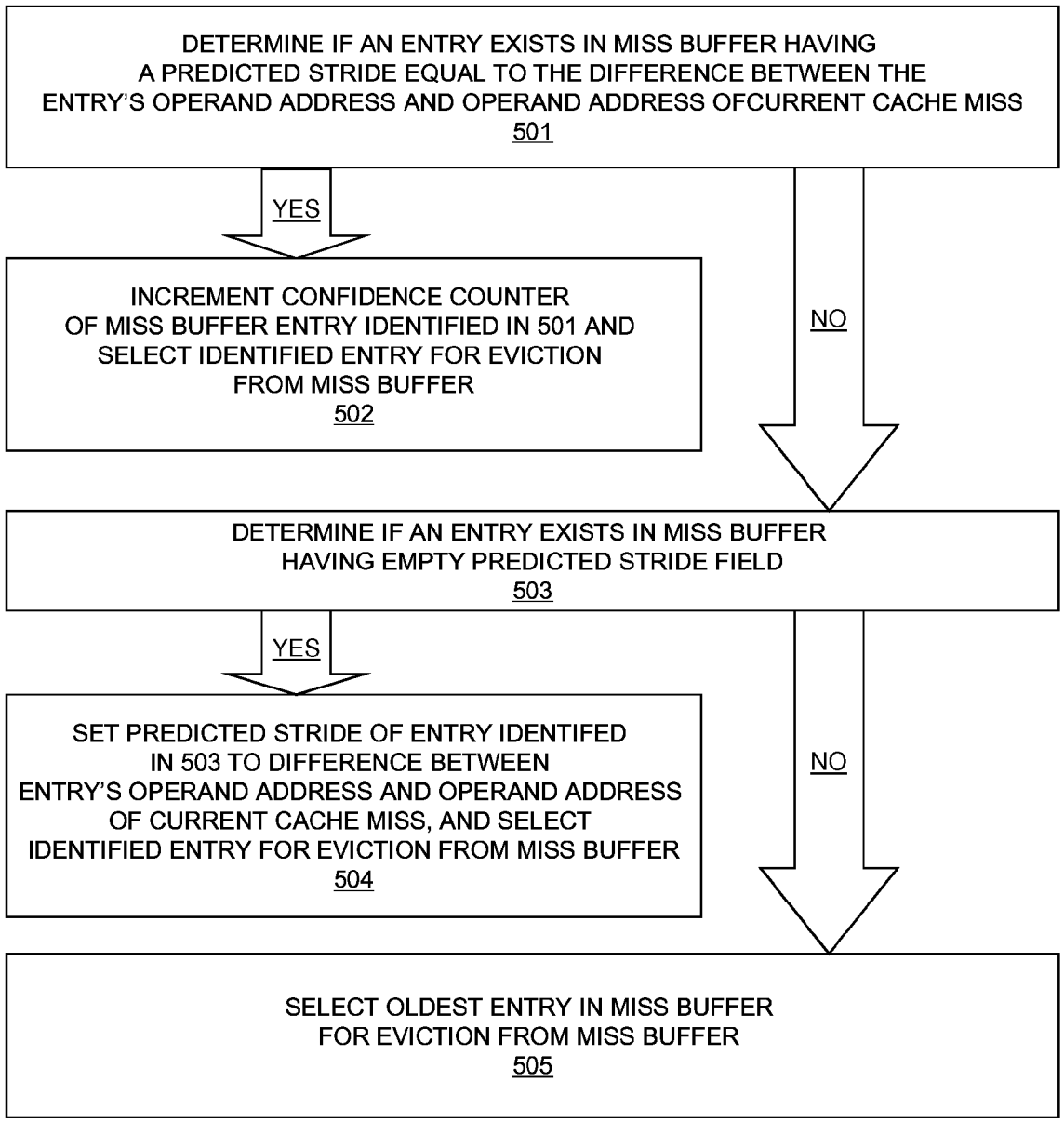

FIG. 5 illustrates a flowchart of an embodiment of a method 500 for selecting a miss buffer entry for eviction as is performed in block 404 of method 400. First, in block 501, it is determined if any entry in the miss buffer 204/301 has a predicted stride 304A-B equal to a difference between the operand address 303A-B in the entry and the operand address of the current cache miss. If an entry (for example, entry 302A-305A) having a predicted stride 304A equal to the difference between the operand address 303A of the entry and the operand address of the current cache miss is determined to exist in block 501, then, in block 502, the confidence counter 305A of the entry is incremented (unless, in some embodiments, the confidence counter 305A has reached a maximal confidence counter value), the entry 302A-305A is selected for eviction, and flow of method 500 ends. If no entry was identified in block 501, flow of method 500 proceeds from block 501 to block 503, in which it is determined if any entry in the miss buffer 204/301 has an empty predicted stride 304A-B. If an entry (for example, entry 302A-305A) having an empty predicted stride 304A is determined to exist in miss buffer 204/301, then, in block 504, the predicted stride 304A is set to the difference between the operand address 303A and the operand address of the current cache miss, the entry is selected for eviction, and flow of method 500 ends. Lastly, if no entry was identified in either block 501 or 503, flow proceeds to block 505, in which the oldest entry in the miss buffer 204/301 is selected for eviction. The oldest entry in the miss buffer 204/301 may be determined in any appropriate manner. In some embodiments, the entries in miss buffer 204/301 may be sorted by age; for example, new entries may always be written into a first slot in the miss buffer 204/301. If the entry to be evicted is in the second slot (i.e., is the oldest entry), the contents of the first slot may be copied into the second slot;

otherwise the first slot is overwritten. In other embodiments, a field indicating the age of each entry in the miss buffer 204/301 may be provided.

FIG. 6 illustrates another embodiment of a miss buffer 601 and a history table 611. In some embodiments, miss buffer 601 may comprise miss buffer 204 of FIG. 2, and history table 611 may comprise history table 205 of FIG. 2. Each entry in the miss buffer 601 and history table 611 includes a respective predicted stride 604A-B/614A-N, and confidence counter 605A-B/615A-N. The miss buffer entries in miss buffer 601 each additionally comprise an instruction address 602A-B and operand address 603A-B. The entries in history table 611 are indexed using a hash of the instruction address associated with the entry. The entries in the miss buffer 601 and history table 611 each additionally comprise a respective address tag 606A-B/616A-N, a liveness counter 607A-B/617A-N, and the entries in miss buffer 601 each additionally comprise a mismatch flag 608A-B. The address tag 606A-B/616A-N, liveness counter 607A-B/617A-N, and mismatch flag 608A-B are used for collision detection. The address tag 606A-B/616A-N comprises additional bits of the instruction address. The liveness counter 607A-B in the miss buffer may be decremented if a mismatch occurs, and an entry may be discarded from the history table 611 if its liveness counter 617A-N is equal to zero. The mismatch flag 608A-B comprises a bit that functions as a flag indicating an address mismatch that is determined based on the address tag 616A-N in a history table entry that is determined to correspond to an incoming cache miss. Miss buffer 601 and history table 611 are shown for illustrative purposes only; a miss buffer and history table may each comprise any appropriate number of entries.

Figure 7:
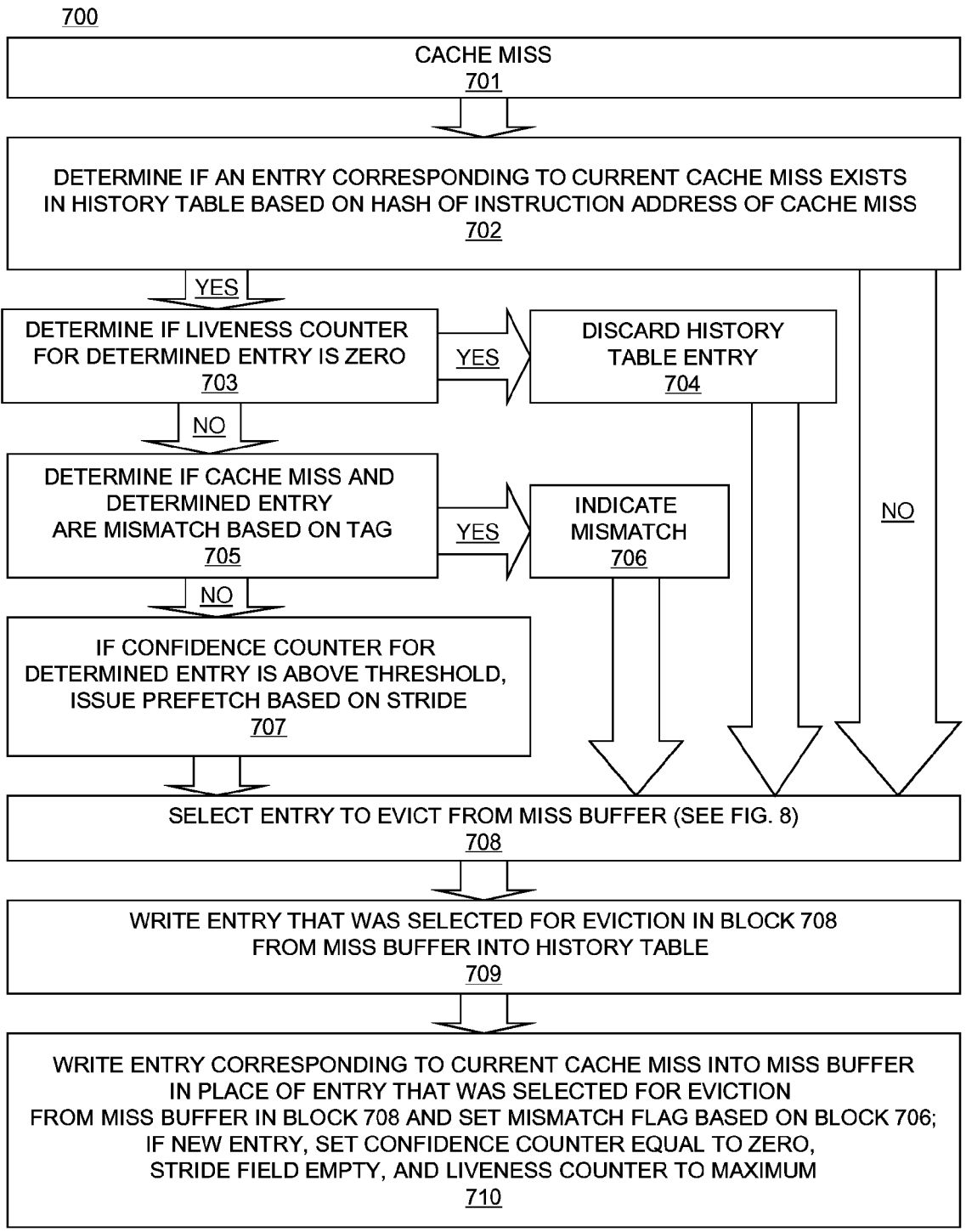
FIGS. 7-8 depict a process flow for automatic pattern-based operand prefetching in accordance with another embodiment.

FIG. 7 illustrates a flowchart of an embodiment of a method 400 for automatic pattern-based prefetching. FIG. 7 is discussed with respect to FIGS. 2 and 6. First, in block 701, an operand cache miss occurs in pipeline 202. Next, in block 702, the history table 205/611 is checked by prefetch logic 203 to determine the existence of an entry indexed by a hash of the instruction address of the current cache miss that occurred in block 701. If no entry indexed by a hash of the instruction address of the current cache miss exists in the history table 205/611, flow proceeds to block 708 of FIG. 700. If an entry (for example, history table entry 614A-617A) indexed by a hash of the instruction address of the current cache miss exists is determined to exist in the history table 205/611, flow proceeds to block 703, in which it is determined if the liveness counter 617A for the determined entry is equal to zero. If it is determined in block 703 that the liveness counter 617A is equal to zero, flow proceeds to block 704, in which the determined history table entry is discarded, and flow proceeds to block 708. However, if it is determined in block 703 that the liveness counter 617A of the determined entry is not equal to zero, flow proceeds to block 705 of method 700, in which it is determined if the current cache miss and the determined entry are a mismatch based on the address tag field 616A-N. If it is determined in block 705 that the cache miss and the determined entry are a mismatch, a mismatch is indicated in block 706, and flow proceeds to block 708. If it is determined that the current cache miss and the determined entry are not a mismatch in block 705, flow proceeds to block 707 of FIG. 7, in which, if the confidence counter 615A for the determined history table entry is above a confidence threshold, a prefetch instruction for a next operand is issued based on the predicted stride 614A. The prefetch request for the next operand may have an operand address equal to the operand address of the current cache miss plus the predicted stride 614A.

Flow of method 700 then proceeds to block 708, in which an entry in miss buffer 204/601 is selected for eviction. The process flow of block 708 of FIG. 7 is discussed in further detail with respect to FIG. 8. Then, flow proceeds to block 709, in which the entry that was selected for eviction (for example, entry 602A-605A) from the miss buffer 204/601 in block 708 is written into the history table 205/611. In the event the history table 205/611 is full, an entry having a liveness counter 607A-N that is equal to zero or the oldest entry in the history table may be overwritten in block 709 in various embodiments. Lastly, in block 710, an entry corresponding to the current cache miss is inserted into the miss buffer 204/601 in place of the entry that was selected for eviction in block 708. The inserted entry may comprise the history table entry that was identified in block 702 of method 700, and the mismatch flag 608A is set based on whether a mismatch was indicated in block 706. If the entry comprises a new entry (i.e., no entry was determined in block 702, or the determined entry was discarded in block 704), a new entry comprising the instruction address 602A, operand address 603A, and address tag 606A of the current cache miss is created and inserted into the miss buffer 204/601. The predicted stride 604A for the new entry is initially empty (or zero), the confidence counter 605A is initially set to zero, the liveness counter 607A is set to a maximum liveness counter value, and the mismatch flag 608A is set to indicate no mismatch.

Figure 8:
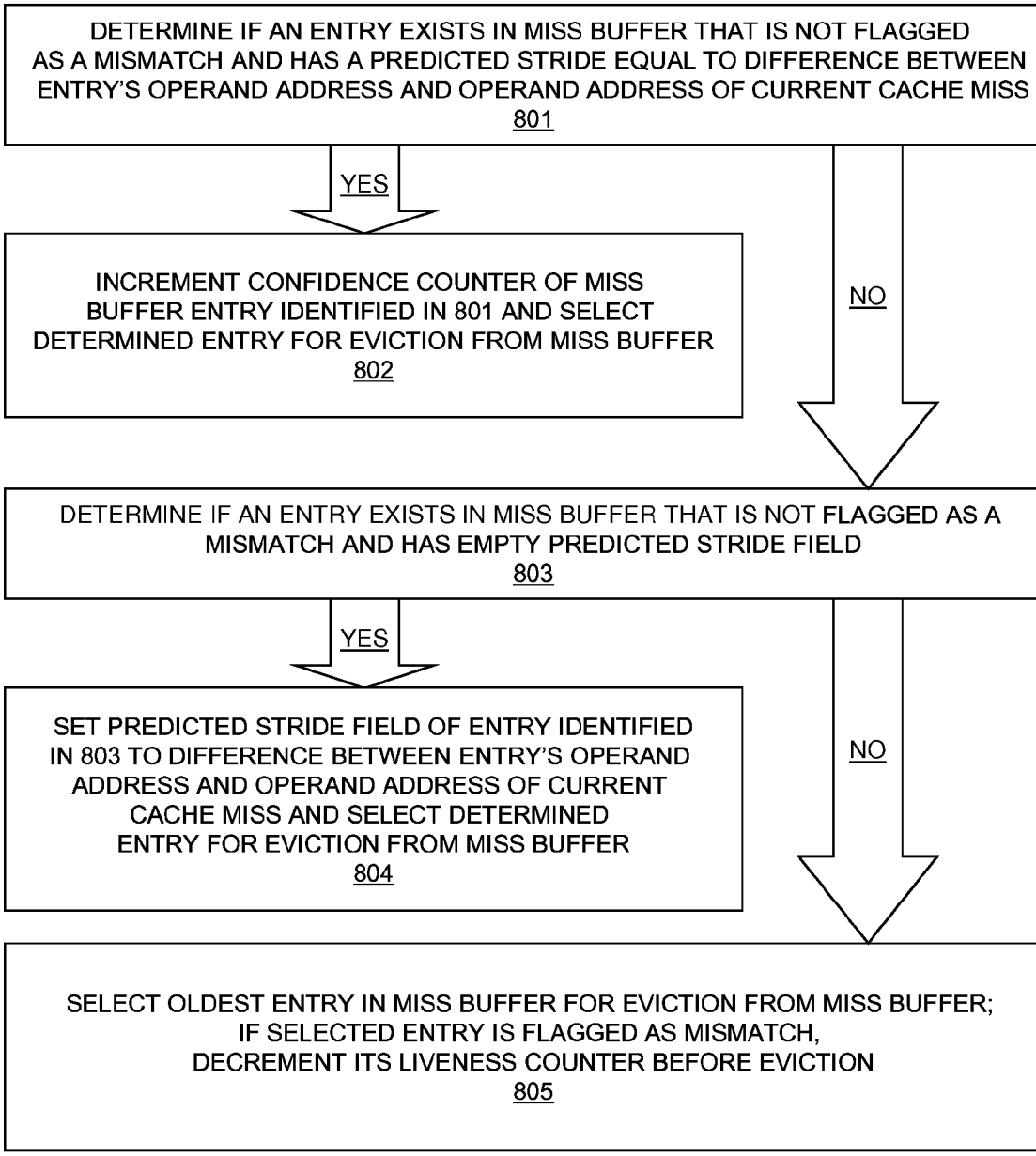

FIG. 8 illustrates a flowchart of an embodiment of a method 800 for selecting an entry from miss buffer 204/601 for eviction as is performed in block 708 of method 700. First, in block 801, it is determined if any entry in the miss buffer 204/301 has a predicted stride 604A-B equal to a difference between the operand address 603A-B in the entry and the operand address of the current cache miss. If an entry (for example, entry 602A-605A) having a predicted stride 604A equal to the difference between the operand address 603A of the entry and the operand address of the current miss is determined to exist in block 801, then, in block 802, the confidence counter 605A of the entry is incremented (unless, in some embodiments, the confidence counter 605A has reached a maximal confidence counter value), the entry 602A-605A is selected for eviction, and flow of method 800 ends. If no entry was identified in block 801, flow of method 800 proceeds from block 801 to block 803, in which it is determined if any entry in the miss buffer 204/601 has an empty predicted stride 604A-B. If an entry (for example, entry 602A-605A) having an empty predicted stride 604A is determined to exist in miss buffer 204/601, then, in block 804, the predicted stride 604A is set to the difference between the operand address 603A and the operand address of the current cache miss, the entry is selected for eviction, and flow of method 800 ends. Lastly, if no entry was identified in either block 801 or 803, flow proceeds to block 805, in which the oldest entry in the miss buffer 204/601 is selected for eviction. Before eviction, if the selected miss buffer entry was flagged as a mismatch (i.e. mismatch flag 608A is set), its liveness counter 607A is decremented. The oldest entry in the miss buffer 204/601 may be determined in any appropriate manner. In some embodiments, the entries in miss buffer 204/601 may be sorted by age; for example, new entries may always be written into a first slot in the miss buffer 204/601. If the entry to be evicted is in the second slot (i.e., is the oldest entry), the contents of the first slot may be copied into the second slot; otherwise the first slot is overwritten. In other embodiments, a field indicating the age of each entry in the miss buffer 204/601 may be provided.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 9:
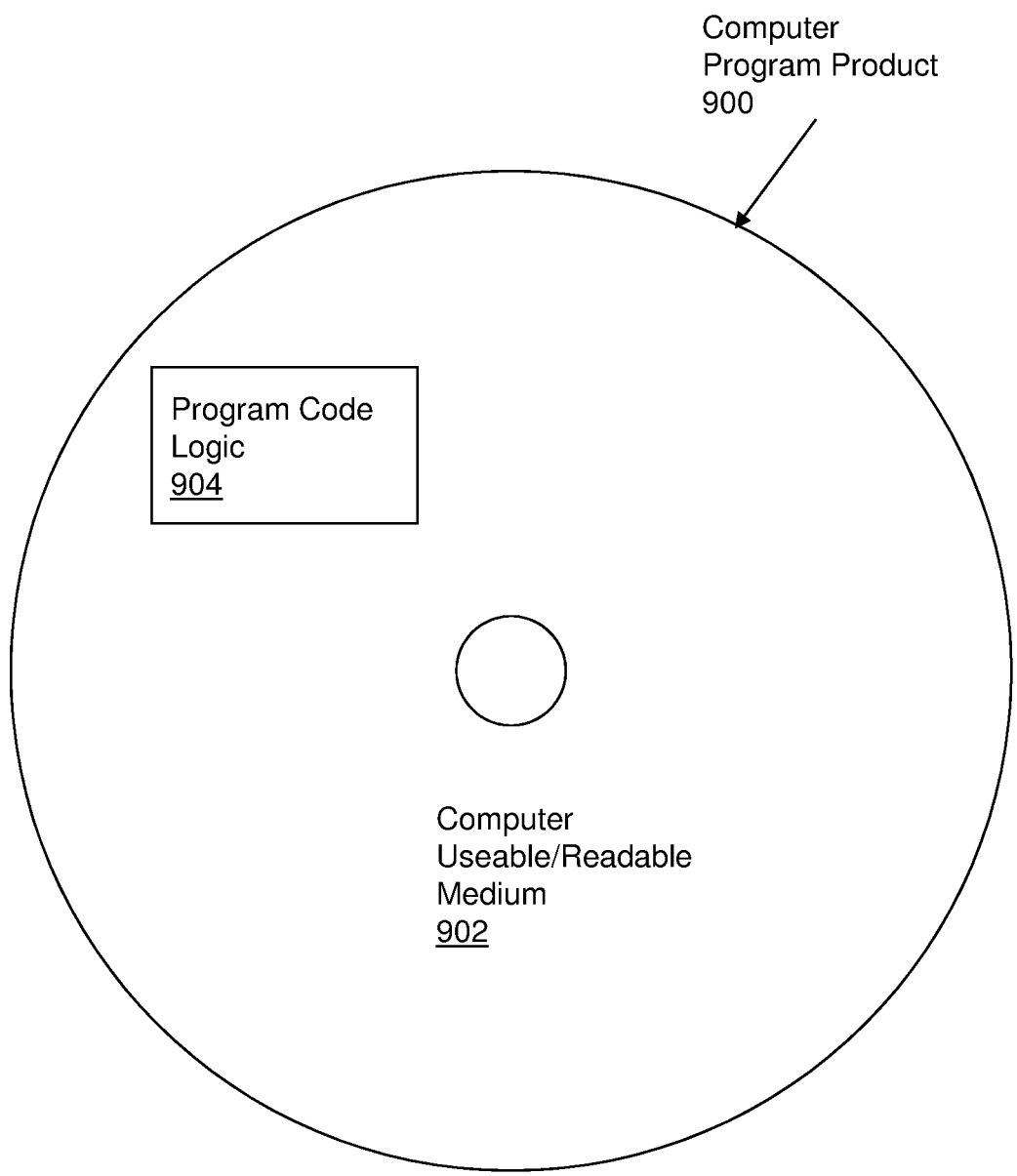
FIG. 9 illustrates a computer program product in accordance with an embodiment.

Referring now to FIG. 9, in one example, a computer program product 900 includes, for instance, one or more storage media 902, wherein the media may be tangible and/or non-transitory, to store computer readable program code means or logic 904 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a method, system, and computer program product for automatic pattern-based operand prefetching. An aspect includes receiving, by prefetch logic in a processor, an operand cache miss from a pipeline of the processor. Another aspect includes determining whether an entry in a history table corresponding to the operand cache miss exists based on an instruction address of the operand cache miss. Yet another aspect includes, based on determining that the entry corresponding to the operand cache miss exists in the history table, issuing a prefetch instruction for a second operand based on the determined entry in the history table, and writing the determined entry into a miss buffer.

In an embodiment, each entry in the miss buffer and in the history table comprises an instruction address, a predicted stride, and a confidence counter, and wherein each entry in the miss buffer additionally comprises an operand address.

In an embodiment, issuing the prefetch instruction for the second operand based on the determined entry in the history table includes determining whether the confidence counter of the determined entry is greater than a confidence threshold; and, based on determining that the confidence counter of the determined entry is greater than the confidence threshold, issuing the prefetch instruction with an operand address equal to an operand address of the operand cache miss plus the predicted stride of the determined entry.

In an embodiment, each entry in the miss buffer and in the history table additionally comprises an address tag, a liveness counter, wherein each entry in the miss buffer additionally comprises a mismatch flag; and issuing the prefetch instruction for the second operand based on the determined entry in the history table further include determining whether the liveness counter of the determined entry is equal to zero; based on determining that the liveness counter of the determined entry is equal to zero, discarding the determined entry; based on determining that the liveness counter of the determined entry is not equal to zero, determining if the operand cache miss and the determined entry are a mismatch based on the address tag; based on determining that the operand cache miss and the determined entry are a mismatch, setting the mismatch flag in a miss buffer entry corresponding to the history table entry; and based on determining that the operand cache miss and the determined entry are not a mismatch, determining whether the confidence counter of the determined entry is greater than a confidence threshold.

In an embodiment writing the determined entry from the history table to the miss buffer includes selecting an entry from the miss buffer for eviction; writing the selected entry to the history table; and writing the determined entry to the miss buffer in place of the selected entry.

In an embodiment selecting the entry from the miss buffer for eviction includes determining whether a given entry exists in the miss buffer having a predicted stride equal to a difference between an operand address of the operand cache miss and the operand address of the given entry; based on determining that the given entry having the predicted stride equal to the difference between the operand address of the operand cache miss and the operand address of the given entry exists in the miss buffer, incrementing the confidence counter of the given entry and selecting the given entry for eviction; based on determining that a given entry having a predicted stride equal to the difference between the operand address of the operand cache miss and the operand address of the entry does not exist in the miss buffer, determining whether a given entry exists in the miss buffer having an empty predicted stride; based on determining that the given entry having the empty predicted stride exists in the miss buffer, setting the predicted stride of the given entry equal to the difference between the operand address of the given entry and the operand address of the operand cache miss, and selecting the given entry for eviction; and based on determining that a given entry having an empty predicted stride does not exist in the miss buffer, selecting an oldest entry in the miss buffer for eviction.

In an embodiment, each entry in the miss buffer and in the history table additionally comprises an address tag and a liveness counter, wherein each entry in the miss buffer additionally comprises a mismatch flag, and further comprising decrementing the liveness counter of the oldest entry in the miss buffer if the mismatch flag indicates a mismatch before evicting the oldest entry from the miss buffer.

In an embodiment, the method, system and computer program product further include based on determining that the entry corresponding to the operand cache miss does not exist in the history table, creating a new entry corresponding to the operand cache miss, wherein the predicted stride of the new entry is empty and the confidence counter of the new entry is equal to zero, and writing the new entry into the miss buffer.

In an embodiment, the new entry additionally comprises an address tag, a liveness counter, and a mismatch flag, wherein the liveness counter in the new entry is set to a liveness counter maximum value, and the mismatch flag in the new entry is set to indicate no mismatch.

Technical effects and benefits include avoidance of operand cache miss penalties in a processor pipeline.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for automatic pattern-based operand prefetching, the system comprising:
   a processor comprising a pipeline, a prefetch logic, a history table, and a miss buffer, the system configured to perform a method comprising:
   receiving, by the prefetch logic, an operand cache miss from the pipeline;
   determining that an entry in the history table corresponding to the operand cache miss exists based on an instruction address of the operand cache miss; and
   based on determining that the entry corresponding to the operand cache miss exists in the history table:
   issuing a prefetch instruction for a second operand based on the determined entry in the history table; and
   writing the determined entry into the miss buffer.

2. The computer system of claim 1, wherein each entry in the miss buffer and in the history table comprises an instruction address, a predicted stride, and a confidence counter, and wherein each entry in the miss buffer additionally comprises an operand address.

3. The computer system of claim 2, wherein issuing the prefetch instruction for the second operand based on the determined entry in the history table comprises:
   determining whether the confidence counter of the determined entry is greater than a confidence threshold; and
   based on determining that the confidence counter of the determined entry is greater than the confidence threshold, issuing the prefetch instruction with an operand address equal to an operand address of the operand cache miss plus the predicted stride of the determined entry.

4. The computer system of claim 2, wherein each entry in the miss buffer and in the history table additionally comprises an address tag, a liveness counter, wherein each entry in the miss buffer additionally comprises a mismatch flag, and wherein issuing the prefetch instruction for the second operand based on the determined entry in the history table further comprises:
   determining whether the liveness counter of the determined entry is equal to zero;
   based on determining that the liveness counter of the determined entry is equal to zero, discarding the determined entry;
   based on determining that the liveness counter of the determined entry is not equal to zero, determining if the operand cache miss and the determined entry are a mismatch based on the address tag;
   based on determining that the operand cache miss and the determined entry are a mismatch, setting the mismatch flag in a miss buffer entry corresponding to the history table entry; and
   based on determining that the operand cache miss and the determined entry are not a mismatch, determining whether the confidence counter of the determined entry is greater than a confidence threshold.

5. The computer system of claim 2, wherein writing the determined entry from the history table to the miss buffer comprises:
   selecting an entry from the miss buffer for eviction;
   writing the selected entry to the history table; and
   writing the determined entry to the miss buffer in place of the selected entry.

6. The computer system of claim 5, wherein selecting the entry from the miss buffer for eviction comprises:
   determining whether a given entry exists in the miss buffer having a predicted stride equal to a difference between an operand address of the operand cache miss and the operand address of the given entry;
   based on determining that the given entry having the predicted stride equal to the difference between the operand address of the operand cache miss and the operand address of the given entry exists in the miss buffer, incrementing the confidence counter of the given entry and selecting the given entry for eviction;
   based on determining that a given entry having a predicted stride equal to the difference between the operand address of the operand cache miss and the operand address of the entry does not exist in the miss buffer, determining whether a given entry exists in the miss buffer having an empty predicted stride;
   based on determining that the given entry having the empty predicted stride exists in the miss buffer, setting the predicted stride of the given entry equal to the difference between the operand address of the given entry and the operand address of the operand cache miss, and selecting the given entry for eviction; and
   based on determining that a given entry having an empty predicted stride does not exist in the miss buffer, selecting an oldest entry in the miss buffer for eviction.

7. The computer system of claim 6, wherein each entry in the miss buffer and in the history table additionally comprises an address tag and a liveness counter, wherein each entry in the miss buffer additionally comprises a mismatch flag, and further comprising decrementing the liveness counter of the oldest entry in the miss buffer if the mismatch flag indicates a mismatch before evicting the oldest entry from the miss buffer.

8. The computer system of claim 2, further comprising based on determining that the entry corresponding to the operand cache miss does not exist in the history table, creating a new entry corresponding to the operand cache miss, wherein the predicted stride of the new entry is empty and the confidence counter of the new entry is equal to zero, and writing the new entry into the miss buffer.

9. The computer system of claim 8, wherein the new entry additionally comprises an address tag, a liveness counter, and a mismatch flag, wherein the liveness counter in the new entry is set to a liveness counter maximum value, and the mismatch flag in the new entry is set to indicate no mismatch.

10. A computer implemented method for automatic pattern-based operand prefetching, the method comprising:
   receiving, by prefetch logic in a processor, an operand cache miss from a pipeline of the processor;
   determining that an entry in a history table corresponding to the operand cache miss exists based on an instruction address of the operand cache miss; and
   based on determining that the entry corresponding to the operand cache miss exists in the history table:
      issuing a prefetch instruction for a second operand based on the determined entry in the history table; and
      writing the determined entry into a miss buffer.

11. The computer implemented method of claim 10, wherein each entry in the miss buffer and in the history table comprises an instruction address, a predicted stride, and a confidence counter, and wherein each entry in the miss buffer additionally comprises an operand address.

12. The computer implemented method of claim 11, wherein issuing the prefetch instruction for the second operand based on the determined entry in the history table comprises:
   determining whether the confidence counter of the determined entry is greater than a confidence threshold; and
   based on determining that the confidence counter of the determined entry is greater than the confidence threshold, issuing the prefetch instruction with an operand address equal to an operand address of the operand cache miss plus the predicted stride of the determined entry.

13. The computer implemented method of claim 11, wherein each entry in the miss buffer and in the history table additionally comprises an address tag, a liveness counter, wherein each entry in the miss buffer additionally comprises a mismatch flag, and wherein issuing the prefetch instruction for the second operand based on the determined entry in the history table further comprises:
   determining whether the liveness counter of the determined entry is equal to zero;
   based on determining that the liveness counter of the determined entry is equal to zero, discarding the determined entry;
   based on determining that the liveness counter of the determined entry is not equal to zero, determining if the operand cache miss and the determined entry are a mismatch based on the address tag;
   based on determining that the operand cache miss and the determined entry are a mismatch, setting the mismatch flag in a miss buffer entry corresponding to the history table entry; and
   based on determining that the operand cache miss and the determined entry are not a mismatch, determining whether the confidence counter of the determined entry is greater than a confidence threshold.

14. The computer implemented method of claim 11, wherein writing the determined entry from the history table to the miss buffer comprises:
selecting an entry from the miss buffer for eviction;
writing the selected entry to the history table; and
writing the determined entry to the miss buffer in place of the selected entry.

15. The computer implemented method of claim 14, wherein selecting the entry from the miss buffer for eviction comprises:
determining whether a given entry exists in the miss buffer having a predicted stride equal to a difference between an operand address of the operand cache miss and the operand address of the given entry;
based on determining that the given entry having the predicted stride equal to the difference between the operand address of the operand cache miss and the operand address of the given entry exists in the miss buffer, incrementing the confidence counter of the given entry and selecting the given entry for eviction;
based on determining that a given entry having a predicted stride equal to the difference between the operand address of the operand cache miss and the operand address of the entry does not exist in the miss buffer, determining whether a given entry exists in the miss buffer having an empty predicted stride;
based on determining that the given entry having the empty predicted stride exists in the miss buffer, setting the predicted stride of the given entry equal to the difference between the operand address of the given entry and the operand address of the operand cache miss, and selecting the given entry for eviction; and
based on determining that a given entry having an empty predicted stride does not exist in the miss buffer, selecting an oldest entry in the miss buffer for eviction.

16. The computer implemented method of claim 15, wherein each entry in the miss buffer and in the history table additionally comprises an address tag and a liveness counter, wherein each entry in the miss buffer additionally comprises a mismatch flag, and further comprising decrementing the liveness counter of the oldest entry in the miss buffer if the mismatch flag indicates a mismatch before evicting the oldest entry from the miss buffer.

17. A computer program product for implementing automatic pattern-based operand prefetching, the computer program product comprising:
a tangible non-transitory storage medium readable by a processor and storing instructions for execution by the processor for performing a method comprising:
receiving, by prefetch logic in the processor, an operand cache miss from a pipeline of the processor;
determining that an entry in a history table corresponding to the operand cache miss exists based on an instruction address of the operand cache miss; and
based on determining that the entry corresponding to the operand cache miss exists in the history table:
issuing a prefetch instruction for a second operand based on the determined entry in the history table; and
writing the determined entry into a miss buffer.

18. The computer program product of claim 17, wherein each entry in the miss buffer and in the history table comprises an instruction address, a predicted stride, and a confidence counter, and wherein each entry in the miss buffer additionally comprises an operand address.

19. The computer program product of claim 18, wherein issuing the prefetch instruction for the second operand based on the determined entry in the history table comprises:
determining whether the confidence counter of the determined entry is greater than a confidence threshold; and
based on determining that the confidence counter of the determined entry is greater than the confidence threshold, issuing the prefetch instruction with an operand address equal to an operand address of the operand cache miss plus the predicted stride of the determined entry.

20. The computer program product of claim 18, wherein each entry in the miss buffer and in the history table additionally comprises an address tag and a liveness counter, wherein each entry in the miss buffer additionally comprises a mismatch flag, and wherein issuing the prefetch instruction for the second operand based on the determined entry in the history table further comprises:
determining whether the liveness counter of the determined entry is equal to zero;
based on determining that the liveness counter of the determined entry is equal to zero, discarding the determined entry;
based on determining that the liveness counter of the determined entry is not equal to zero, determining if the operand cache miss and the determined entry are a mismatch based on the address tag;
based on determining that the operand cache miss and the determined entry are a mismatch, setting the mismatch flag in a miss buffer entry corresponding to the history table entry; and
based on determining that the operand cache miss and the determined entry are not a mismatch, determining whether the confidence counter of the determined entry is greater than a confidence threshold.

* * * * *